United States Patent
Joo et al.

(10) Patent No.: US 8,141,032 B2
(45) Date of Patent: Mar. 20, 2012

(54) N-TIERED APPLICATIONS SUPPORT VIA COMMON INTERFACE

(75) Inventors: Young Kun Joo, Issaquah, WA (US); Zhanliang Chen, Sammamish, WA (US); Ryan Cavanaugh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1448 days.

(21) Appl. No.: 11/670,663

(22) Filed: Feb. 2, 2007

(65) Prior Publication Data

US 2008/0189678 A1    Aug. 7, 2008

(51) Int. Cl.
*G06F 9/44* (2006.01)
(52) U.S. Cl. .......................... 717/104; 717/101; 717/105
(58) Field of Classification Search .................. 717/101, 717/104, 105, 121; 707/615, 620, 625
See application file for complete search history.

(56) References Cited

U.S. PATENT DOCUMENTS

| | | | |
|---|---|---|---|
| 5,295,222 A | | 3/1994 | Wadhwa et al. |
| 5,457,797 A | * | 10/1995 | Butterworth et al. ......... 719/320 |
| 5,699,310 A | | 12/1997 | Garloff |
| 5,905,979 A | * | 5/1999 | Barrows ................................ 1/1 |
| 6,085,198 A | | 7/2000 | Skinner et al. |
| 6,742,175 B1 | | 5/2004 | Brassard |
| 6,931,621 B2 | | 8/2005 | Green et al. |
| 6,948,150 B1 | | 9/2005 | Pepin |
| 6,993,759 B2 | | 1/2006 | Aptus et al. |
| 7,047,518 B2 | | 5/2006 | Little et al. |
| 7,167,865 B1 | * | 1/2007 | Tharp et al. ........................... 1/1 |
| 7,685,183 B2 | * | 3/2010 | Pace et al. ..................... 707/610 |
| 7,685,184 B2 | * | 3/2010 | Choi et al. ..................... 707/614 |
| 7,761,848 B1 | * | 7/2010 | Chaffin ......................... 717/116 |
| 2004/0111428 A1 | | 6/2004 | Rajan et al. |
| 2005/0028133 A1 | * | 2/2005 | Ananth et al. ................. 717/105 |
| 2005/0262488 A1 | * | 11/2005 | Wagner et al. ................. 717/144 |

FOREIGN PATENT DOCUMENTS

WO      2004040399      5/2004

OTHER PUBLICATIONS

Oldby et al., Application design of a layered architecture in ASP.NET 2.0, May 29, 2006.*
Build Net Applications Without Hand-Coding Use Application Generation to Expedite Web Application Development. Iron Speed, Inc. Dec. 2004. http://www.ironspeed.com/pdf/Build%20. NET%20Applications%20 Without%20Hand-Coding.pdf. Last accessed Dec. 6, 2006.
A model driven development automation engine. ACE. http://www.omg.org/mda/mda_files/ACE.pdf. Last accessed Dec. 6, 2006.
Khawar Ahmed, et al.. Enterprise Java and Rational Rose—Part I. http://www-128.ibm.com/developerworks/ rational/library/content/RationalEdge/jan01/EnterpriseJavaandRationalRoseJan01.pdf.. Last accessed Dec. 6, 2006.

* cited by examiner

*Primary Examiner* — Li Zhen
*Assistant Examiner* — Lenin Paulino
(74) *Attorney, Agent, or Firm* — Workman Nydegger

(57) ABSTRACT

A development system is provided. The system includes a workspace component to visually display one or more model components. A separation component automatically segments the model components into two or more project components. A synchronization component can be provided to automatically update at least one of the project components in view of changes made to at least one other project component.

17 Claims, 9 Drawing Sheets

N-TIERED APPLICATIONS SUPPORT VIA COMMON INTERFACE

BACKGROUND

Integrated development environments (IDEs) provide a common platform and design tools for modern software development. While software is often the most time-consuming and highest risk aspect of electronic product development, it also holds the greatest potential to enhance a design for multiple target applications. Such design tools allow designers to efficiently develop code where graphical user interfaces (GUI) automates and simplifies the configuration of complex programming projects. These tools also enable designers to create source code by enhancing code readability and simplifying code writing. For instance, source code editor features may include syntax coloring, auto-indenting, and shortcut menus that link stored procedure calls to their definitions, declarations, and usages even when these references reside in separate files. Other aspects of the tools include simulation resources to allow designers to develop and debug applications when hardware resources are scarce or unavailable.

One area of software development that is performed on IDEs includes mapping class objects to relational objects, referred to as O/R mapping, and is the latest advancement in modern day programming technologies. It improves the productivity of programmers by many degrees while providing flexibility to adapt to changing business needs. While O/R technology itself provides many benefits to programmers, enabling O/R classes to be created and set up correctly is not an easy task for normal development nor is it well-supported in current programming tools. Without providing adequate tools support, programmers trying to adopt the technology may be forced to write their respective code manually.

One purpose driving O/R technologies is the need to interface the relational database world with the models supported in the object oriented programming world. For example, relational database management systems (RDBMS) supporting the relational database predated the popularization of object-oriented programming in the 1990s. Using relational databases to store object-oriented data leads to a semantic gap where programmers would be required to allow their software to function in two different worlds—processing of data would be performed in object-oriented form, but the same data would have to be stored in relational form.

Requiring this constant conversion between two different forms of the same data not only had the effect of stifling performance, but imposed difficulties to the programmer as the relational or object-oriented forms would impose limitations on each other. For example, relational databases make complicated associations difficult, and they tend to "map" poorly into the object oriented world since they fail to implement the relational model's user-defined types. This problem is sometimes referred to as the Object-Relational impedance mismatch.

When developing multi-tiered, data-centric software in the O/R domain, it is often desired to have clear separations between different logical layers such as presentation layer, business logic layer and data access layer. This becomes more evident as complexity of software architecture increases. Also, introduction and fast adoption of new technologies such as web services often demand that the architecture of software be flexible and modular so that developers can take advantage of new techniques without making significant changes to the application design.

Although many present design systems provide design time data tools that help developers rapidly build data-centric applications with minimal coding, these lack the native support for developers building multi-tiered data-centric applications. For instance, there are often limitations with workspace components (e.g., Dataset Designer) to have business logic (e.g., Data Table) mixed together with data access logic (e.g., Table Adapter), where developers do not have an easy way to migrate their single-tiered architecture to multi-tiered architectures as their business requirements evolve. Rather, developers are often forced to go through generated code, carefully separate out business logic and data access layers into separate assemblies and add proper references manually.

In another regard, when using present design tools to generate code based on a model created and modified within the tools, it is sometimes necessary to manually split different sections of generated code to different target projects. Since a single interface is often employed to manipulate the model, it is also desirable to properly update split code when changes are detected from the tools without having to also perform such updates manually.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A development environment and visual workspace is provided where application models or components can be automatically segmented into multiple projects while providing support for automated updates to the projects as design conditions change. In an aspect, graphical tools are provided that allow generated code to be split or segmented into different target projects. An example includes N-Tier applications support (N being a positive integer) such as in a Typed Dataset example where a single Dataset workspace or interface is employed to generate typed Data Table classes and Table Adapter classes into different target projects.

A synchronization component monitors changes to the application model and propagates those changes to target projects appropriately. Thus, segmentation of code generated from models can be manipulated via a single workspace or designer interface into multiple target projects, where updates to the models can be properly applied across application components after such segmentation. By allowing automatic splitting of models into multiple targets, and providing synchronization support for changes, manual coding and analysis is mitigated.

With N-Tier support for typed dataset applications for example, developers can iteratively evolve the architecture of their applications from single-tiered designs to multi-tiered designs while mitigating or bypassing manual coding steps. For instance, developers may be able to start out with a two-tiered design while initially designing their data layer using a Dataset workspace. When they are ready to take their architecture to a multi-tiered or N-tiered design, the workspace can provide a design time interface to easily split their data layer into a business layer (which includes data entity), data access layer, and/or other layers of the N-tier architecture.

To the accomplishment of the foregoing and related ends, certain illustrative aspects are described herein in connection with the following description and the annexed drawings.

These aspects are indicative of various ways which can be practiced, all of which are intended to be covered herein. Other advantages and novel features may become apparent from the following detailed description when considered in conjunction with the drawings.

DETAILED DESCRIPTION

A graphical design environment is provided that enables applications to be automatically segmented into different target projects while propagating changes between the projects. In one aspect, a development system is provided. The system includes a workspace component to visually display one or more model components. A separation component automatically segments the model components into two or more project components. A synchronization component can be provided to monitor changes with an application model and to allow automatic updates of at least one of the project components in view of changes made to at least one other project component.

As used in this application, the terms "component," "model," "separation," "synchronization," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal).

Figure 1:
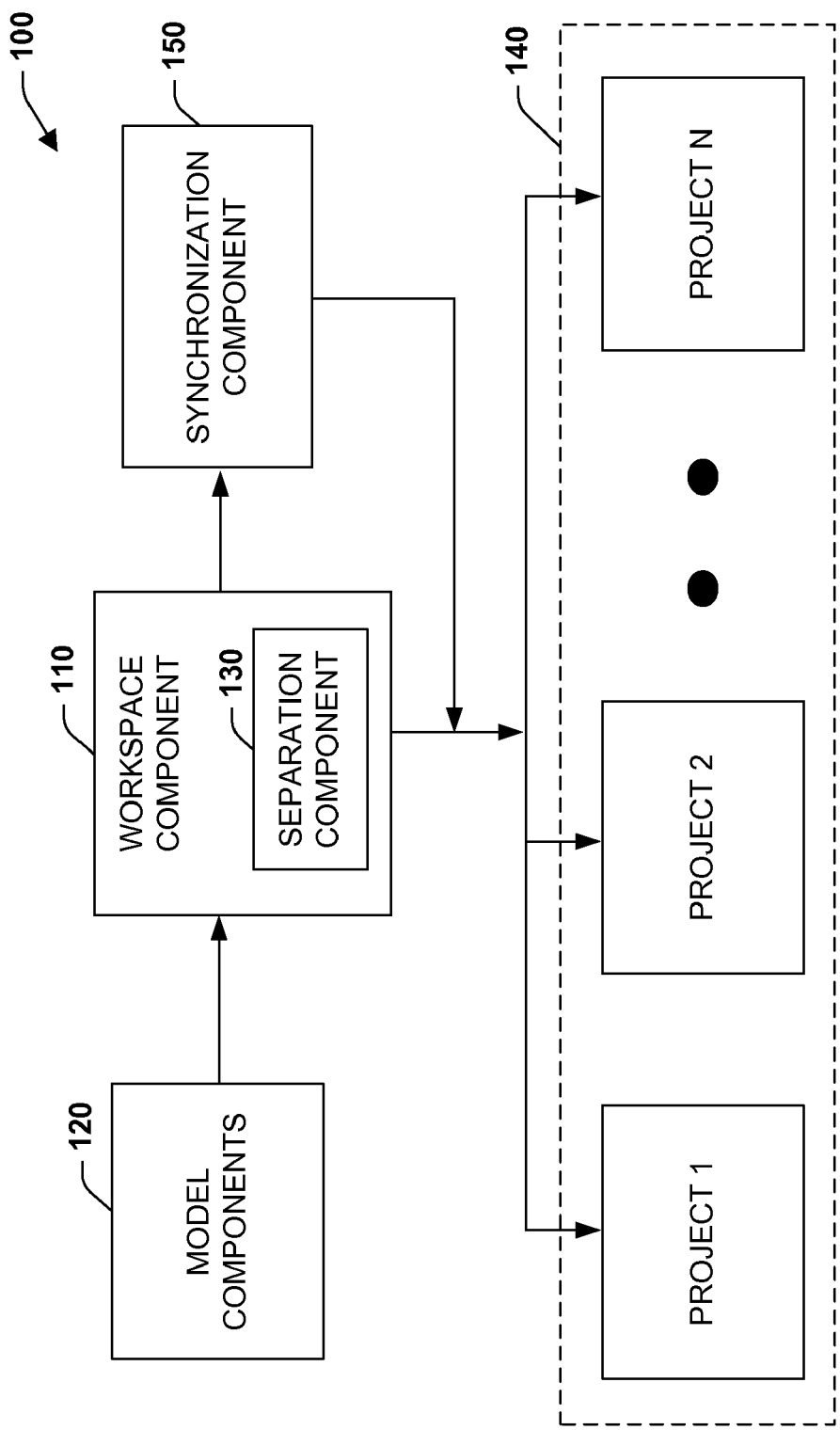
FIG. 1 is a schematic block diagram illustrating a visual development system.

Referring initially to FIG. 1, a visual development system 100 is illustrated to facilitate automated component development. A workspace component 110 is provided where developers can create components for an application. Such workspace component 110 can be associated with a computer or workstation such as an Integrated Development Environment (IDE), for example, having a display where components can be created and operated upon. The workspace component 110 operates on one or more model components 120, where a separation component 130 splits or segments the model components 120 into multiple projects 140. A synchronization component 150 can be provided to monitor the workspace component 110 for potential changes to the project components 140, and if changes are detected, propagate those changes across the project components.

In general, the system 100 provides a development environment and visual workspace where application models or components 120 can be automatically segmented into multiple projects via the separation component 130 while providing support for automated updates to the projects as design conditions change. In an aspect, graphical tools are provided by the separation component 130 that allow generated code to be split or segmented into different target projects. An example includes N-Tier applications support (N being a positive integer) such as in a Typed Dataset example where a single Dataset workspace or interface is employed to generate typed Data Table classes and Table Adapter classes into different target projects 140.

The synchronization component 150 monitors the model components 120 in accordance with the workspace component 110 for changes to the target project 140, where such changes can be automatically propagated to other members of the project. Thus, segmentation of code generated from models 120 can be manipulated via a single workspace or designer interface into multiple target projects 140, where updates to the models can be properly applied across application components after such segmentation. By allowing automatic splitting of models into multiple targets, and providing synchronization support for changes, manual coding and analysis is mitigated.

With N-Tier support for typed dataset applications for example, developers can iteratively evolve the architecture of their applications from single-tiered designs associated with the model components 120 to multi-tiered designs of the projects 140 while mitigating or bypassing manual coding steps. For instance, developers may be able to start out with a two-tiered design at 120 while initially designing their data layer using a Dataset workspace. When they are ready to take their architecture to a multi-tiered or N-tiered design, the workspace component 110 can provide a design time interface at 130 to easily split their data layer into a business layer (which includes data entity), data access layer, and/or other layers of the N-tier architecture.

In another aspect, the system 100 can be employed to create object/relational components. This includes means for developing (workspace component 110) one or more model components 120 and means for splitting (separation component 130 or interface) the model components 120 into two or more N-tier applications at 140. This can also include means for updating (synchronization component 150) at least one of the N-tier applications 140 in view of changes made to at least one other N-tier application.

In general, the workspace component 110 (also referred to as designers) allow users to work with models 120 instead of lines of code and visually manipulate models to generate proper code representing those models. If there are multiple model concepts that are to be managed together due to tight relationships between them, it is desirable to represent those models in the same designer surface so that programmers can clearly see how they are related to each other and visually manage them. It is also desirable to allow code generation for different model concepts to be split into different target projects 140 so that code for one model can be managed and shared with others independent of code for other model concepts. Being able to keep generated code in sync as models are manipulated via the designer or workspace component 110 even after splitting into targets 140 is also desired.

In a specific example, splitting or separation concepts can be illustrated using Typed Dataset code generation. Typed Dataset includes model concepts, Typed Data Table and Table Adapters where programmers can create and manipulate these models using a Dataset Designer. Typed Data Tables are strongly typed data table classes generated based on database objects mapped within the designer and Table Adapters are classes that understand how to retrieve and update data from a database server and how to map data between Typed Data Tables and database objects.

When programmers use a Dataset Designer or other workspace component 110, they are often working with at least two different model concepts, entities (e.g., Typed Data Tables) and data access components (e.g., Table Adapters). Since these components are generally tightly related to each other, it is desirable to represent the components in the same designer surface. However, it is often against the best practices to have code for type definition with data access logic in a single assembly. Thus, when programmers need to share only type definition with others, data access logic which could contain sensitive information about connecting to database should not be included, for example—hence the desire to split model components 120 into the target projects 140.

Splitting or separating can be accommodated by allowing code for Typed Data Tables and Table Adapters in this example to be generated into at least two different projects 140. Thus, programmers can still manipulate both Typed Data Tables and Table Adapters within Dataset Designer and when they are ready to generate code, they can choose to split Type Data Table code into a different project at 140. After code is generated and split into different projects 140, updates made to Typed Data Tables and/or Table Adapters via Dataset Designer can be correctly applied to code in the respective target project. In this example, the workspace component 110 tied together with Typed Dataset (or other application) enables programmers build N-tiered applications.

In addition to various hardware and/or software components, various interfaces can be provided to manipulate components in the workspace 110. This can include a Graphical User Interface (GUI) to interact with the user or other components such as any type of application that sends, retrieves, processes, and/or manipulates data, receives, displays, formats, and/or communicates data, and/or facilitates operation of the system 100. For example, such interfaces can also be associated with an engine, server, client, editor tool or web browser although other type applications can be utilized.

Figure 2:
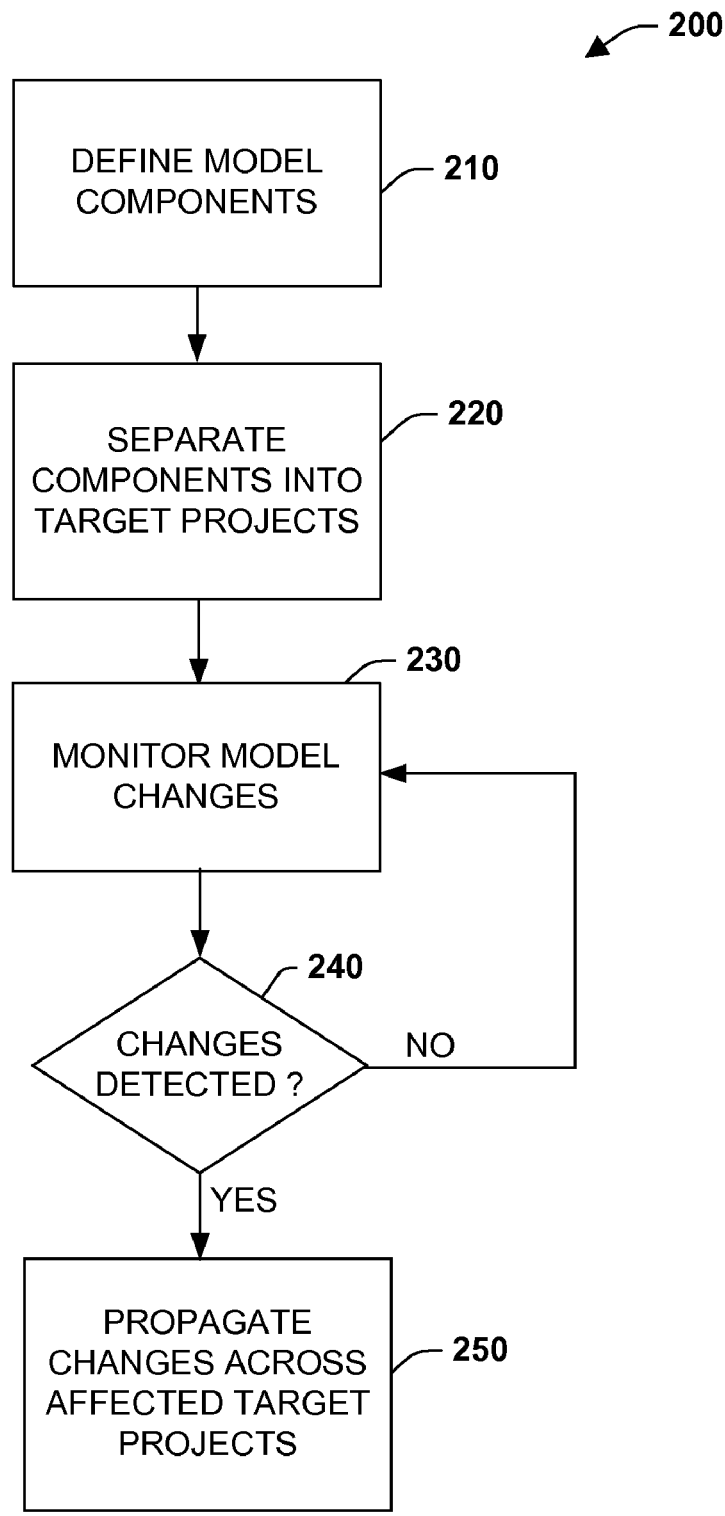
FIG. 2 is a flow diagram that illustrates an exemplary code development process.

FIG. 2 illustrates an exemplary component development process. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 210, one or more model components are defined or developed within the context of a graphical/visual workspace. As noted above, this can include an integrated development environment that provides a visual space or development area where visual objects can be selected from memory and moved onto the space. At 220, model components defined or selected at 210 are separated into various target projects. This can include providing an interface that shows model dependencies and indicates or advises developers on where to split code into the respective projects. This can include automated procedures where developers indicate a desired function or portion of a model they would prefer split into other projects and the procedures operate from the indication. Such indication could be a visual movement such as from a mouse or other control indicating model components to be separated.

At 230, model components are monitored after having been separated at 220. This can include monitoring for a change that may impact one or more other of the separated components. At 240, a decision is made as to whether or not a project change has been detected. If a change has not been detected at 240, the process proceeds back to 230 and continue to monitor for changes. This can include intermittent monitoring such as when a code model is started or background monitoring to check models over time for potential changes. If changes are detected to at least one model at 230, the process proceeds to 250 where changes are then propagated to other components that may have been affected by the respective change detected at 230.

Figure 3:
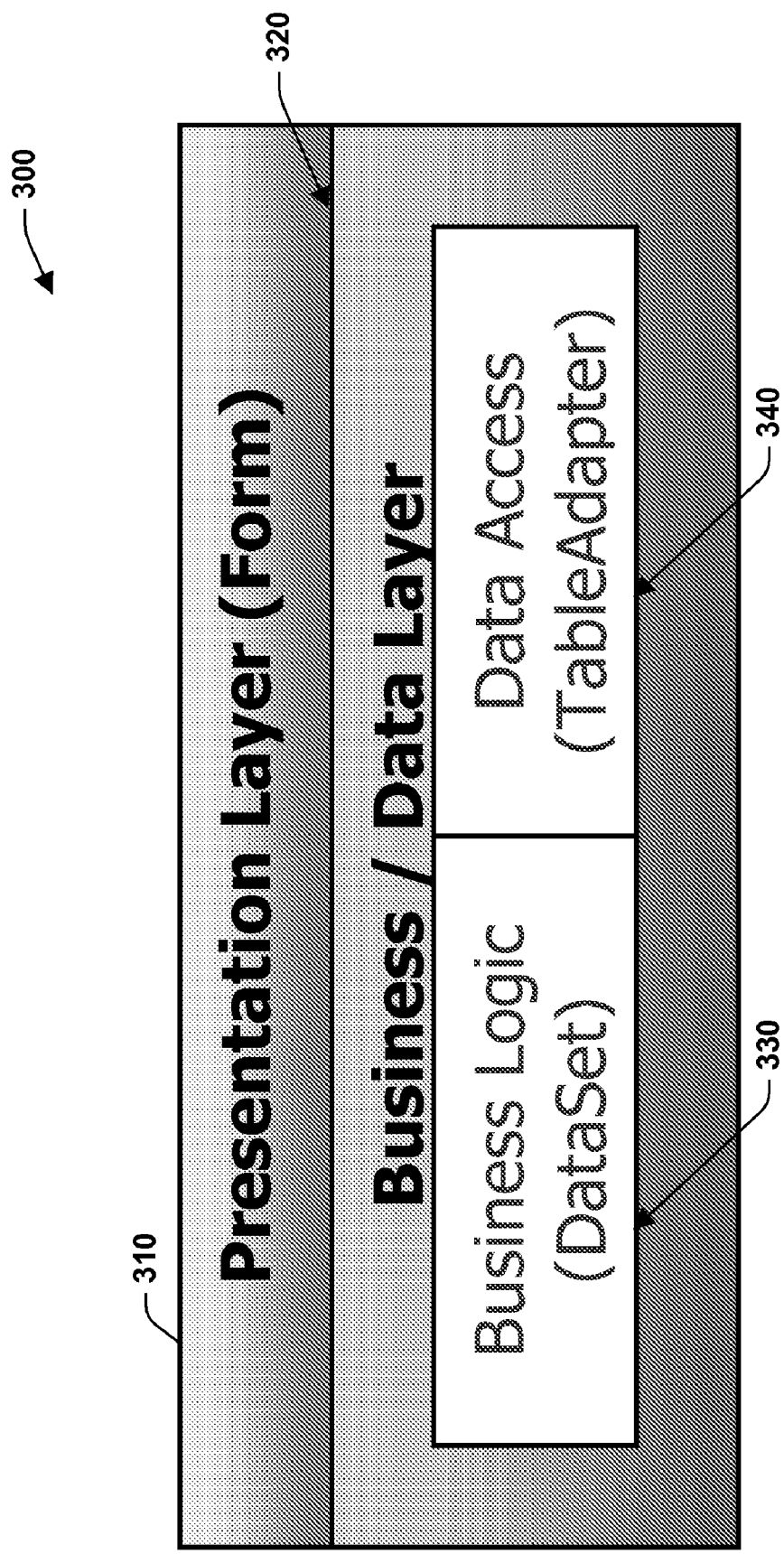
FIG. 3 is a diagram that illustrates an example model component structure.

Referring now to FIG. 3, an example model component structure 300 is illustrated. Design time tools can offer support for building two-tiered data-centric applications. As illustrated at 300, it is straight forward to physically separate out two tiers once they are designed and developers are still able to take advantage of design time tools even after the two tiers are separated out. As shown, the structure 300 includes a presentation layer 310 and a business/data layer 320. Below is an example of a high-level structure of generated Typed Dataset.

```
Partial Public Class Database
...
End Class
Namespace DatabaseTableAdapters
    Partial Public Class CustomersTableAdapter ...
    Partial Public Class OrdersTableAdapter ...
    Partial Public Class Order_DetailsTableAdapter ...
    Partial Public Class ProductsTableAdapter ...
    Partial Public Class EmployeeTableAdapter ...
End Namespace
```

Business logic 330 (typed data table definitions) and data access logic 340 (table adapter definitions) can be generated in a single file. There are clear separations between code for dataset definitions and table adapter definitions. Dataset definitions do not have dependency on table adapter definitions. Table adapter definitions have dependency on dataset definitions. Although this two-tiered model 300 may apply for simpler applications that do not have scalability requirements, implementing multi-tiered design may become more difficult. Employing the separation components described above in FIG. 1, users are able to create multi-tiered datacentric applications by separating strongly typed dataset and Table Adapters, for example, into different layers using design time tools and support offered with a workspace. Thus, they can extend the functionality of strongly typed dataset using a partial class. They can also extend the functionality of Table Adapters using a partial class.

Figure 4:
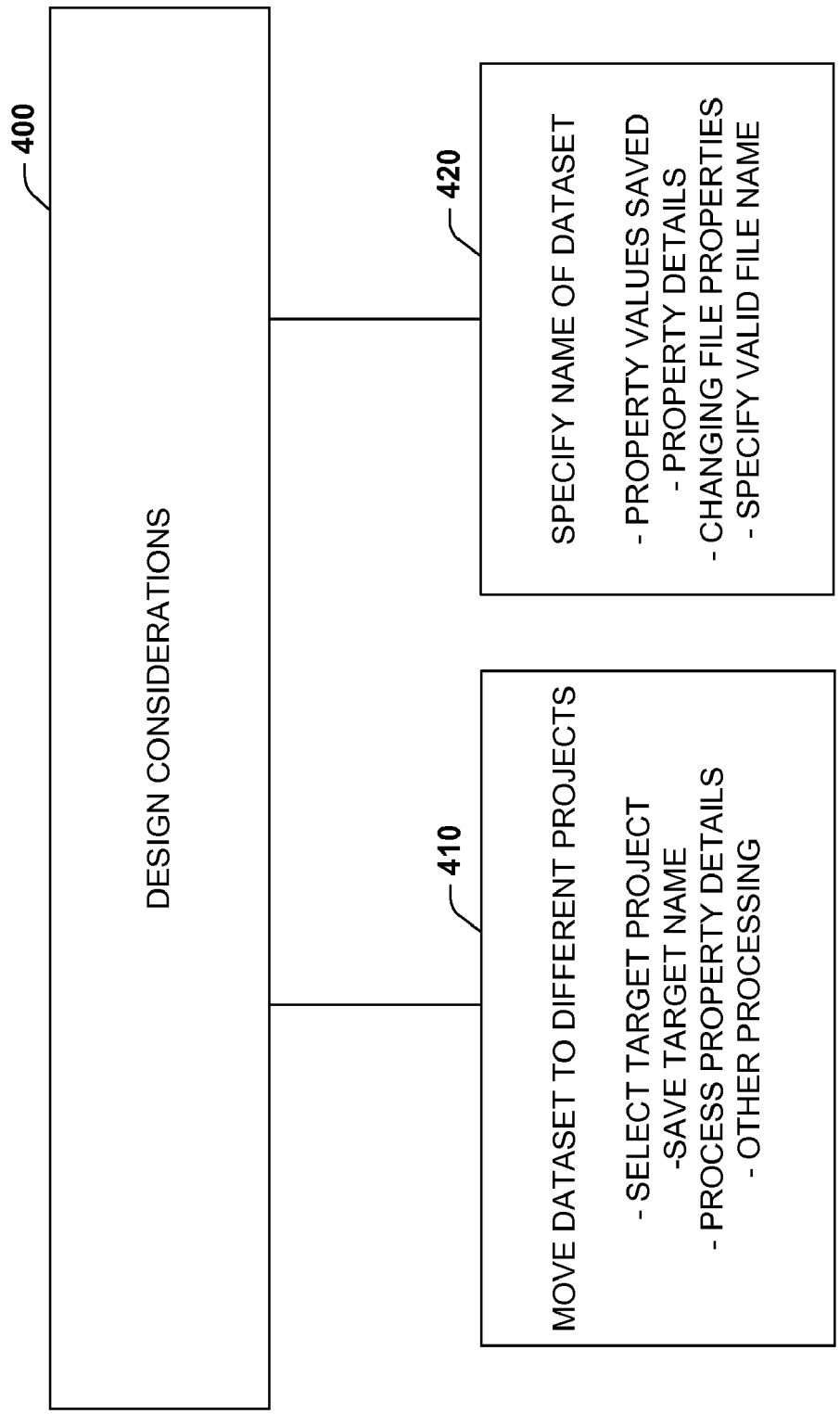
FIG. 4 illustrates example design considerations.

Turning to FIG. 4, example design considerations 400 are illustrated. Proceeding to 410, users move a strongly typed dataset class to one or more different projects. This can include providing an option to select a target project from a new property of a designer, listing out details of the new properties and then persisting changes or edits to the project in a file (e.g., .XSD). A list of other projects in accordance with the current selection can be displayed where available projects can be listed regardless of project type, language used and target framework. Other aspects at 410 include having strongly typed dataset classes moved to the target project upon saving the change from the designer or workspace. This can include adding a comment line that describes the project where a strongly typed dataset class is moved. The comment can also be added to a summary section of an original Typed Dataset code file, for example. Strongly typed dataset class can also be removed from an original Typed Dataset code file. When (Default option) is chosen as target project, no change is generally made.

At 420 of FIG. 4, users can specify a name of strongly typed dataset class file. This includes a file name that is specified from a property of designer or workspace. Property values can be saved in .XSD file as noted above. A new attribute of a <DataSource> element can be added where an Attribute name: Dataset File and Attribute value: specified class file name can be provided. Default options can include a value of a Dataset File attribute of <DataSource> element in .XSD file or empty if attribute does not exist or is empty. When a Dataset Project property is set, the default value for this property can be created using following format: [DatasetName].Dataset. [FileExtensionSpecificToProgrammingLanguageUsed]. When (Default) is chosen for Dataset Project property, the value of this property can be cleared. Other aspects include changing a Dataset File property. This can include applying the correct extension to the end of file name if it is not already included. This feature can be employed to show immediate feedback to the user. In general, a valid file name should be specified (not conflict with other names, proper file extension) and if not, an error dialog can be displayed as shown in FIG. 5.

Figure 5:
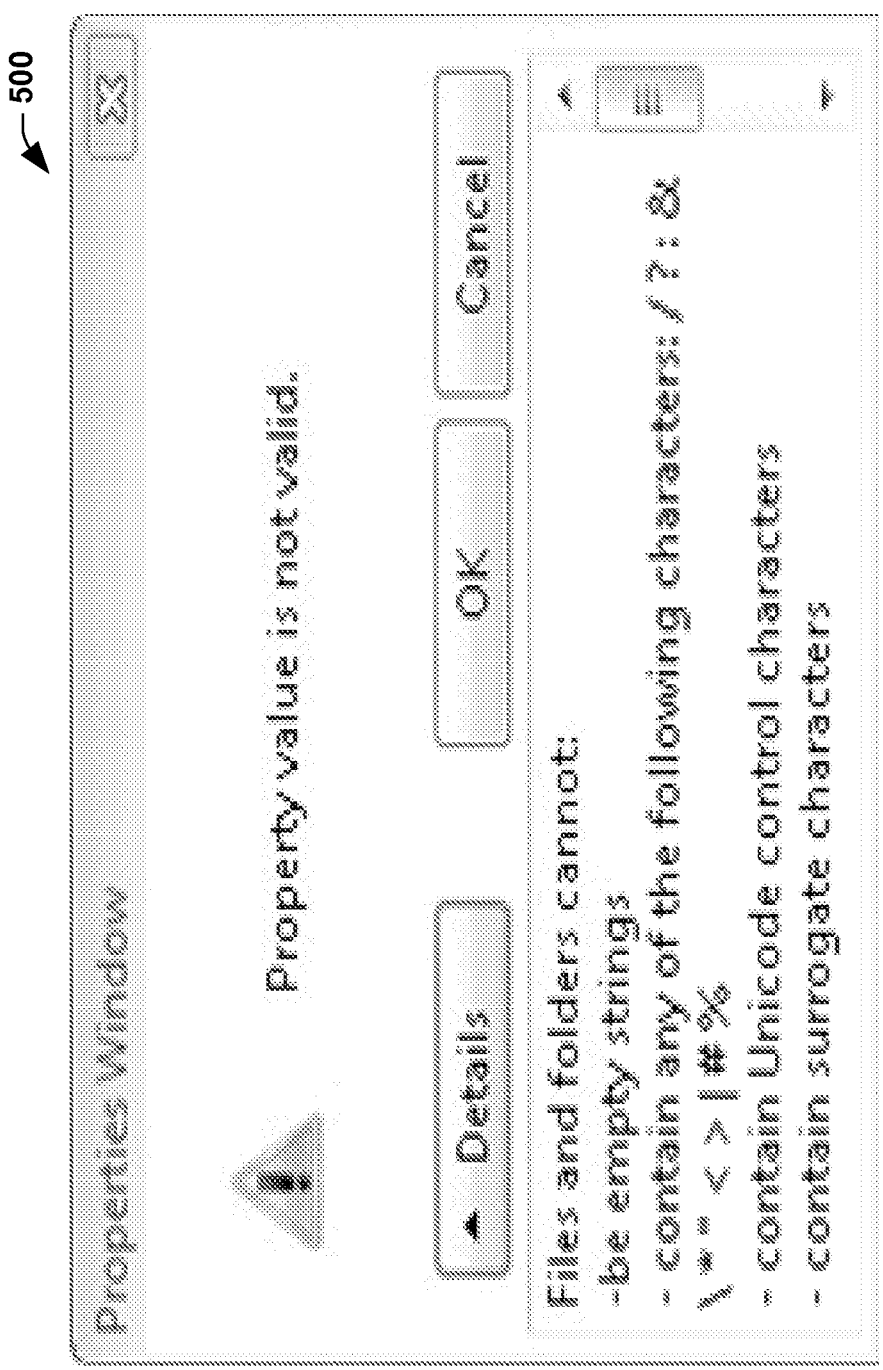
FIG. 5 illustrates an example error dialog.

Referring to FIG. 5, an example error dialog 500 is illustrated. If a valid file name is not specified as noted above with respect to FIG. 4, the error dialog 500 can be displayed. Some of example of what can be displayed in the dialog 500 include: Files and folders cannot:—be empty strings;—contain any of the following characters: / ? : & \ * " < > | #%; — contain Unicode control characters—contain surrogate characters;—be system reserved names, including 'CON', 'AUX', 'PRN', 'COM1' or 'LPT2';—be '.' or '..' Other messages on the dialog can include Please enter a valid name. Invalid file names entered by the user should not be cleared so that the user can see why the error occurs.

In other aspects, users can be prompted for overwriting existing files when a file already exists in a target project. When saving changes from a designer, if there is a file in the target project with the same name, users can be prompted for overwriting: e.g., "By saving your changes, [File Name] in [Target Project] will be overwritten. Do you want to continue?" Generally, a reference to strongly typed dataset class can be added in a TableAdapters class project, where a project reference to the strongly typed dataset class project can be added to Table Adapters class project. This can include a 'using' statement or an 'imports' statement added at the top of Table Adapters class file with the namespace of strongly typed dataset class. Generally, choosing a different target project after class files has already been saved does not trigger special behavior, where a previously selected target project is not modified. When a different target project is specified for strongly typed dataset class is selected, reference in Table Adapters class generally does not change.

Figure 6:
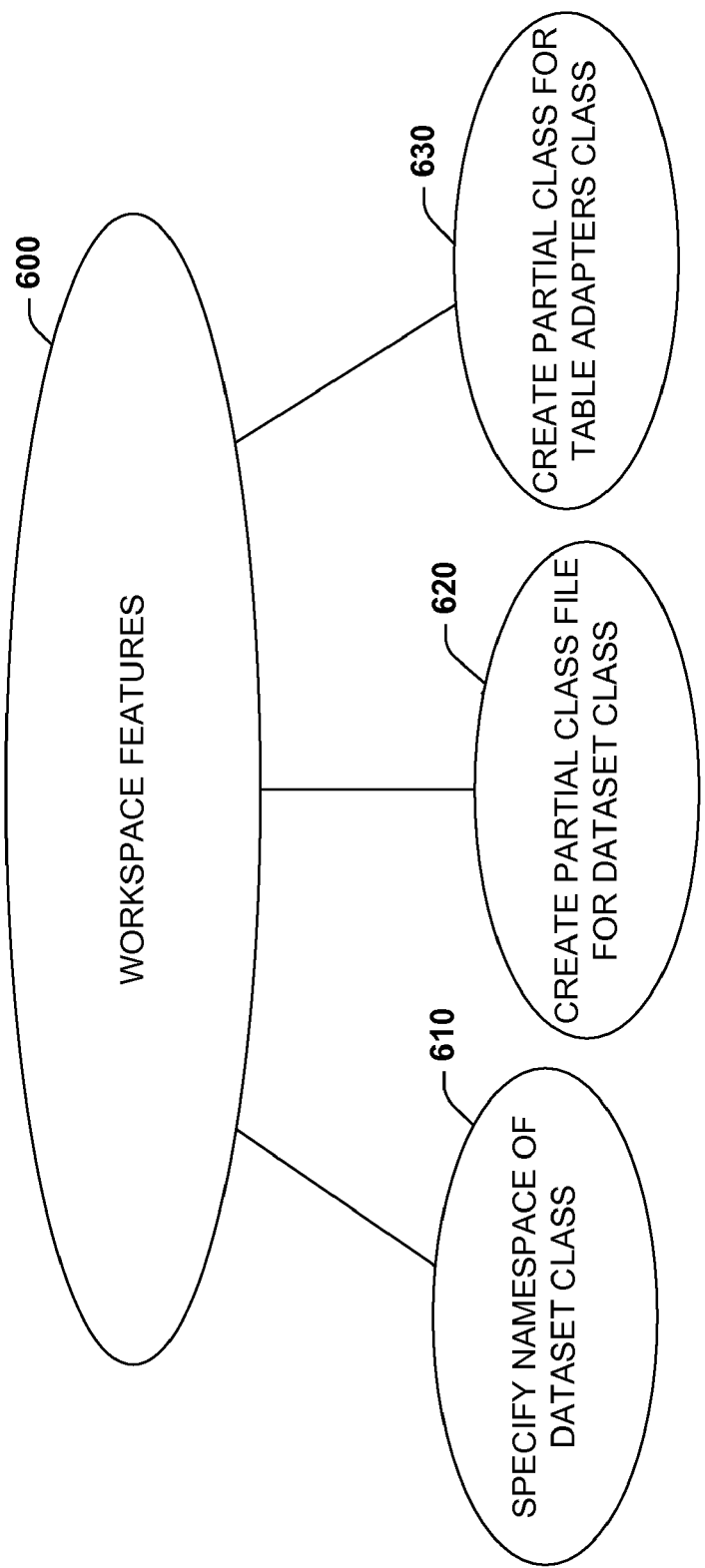
FIG. 6 illustrates example user workspace features.

Referring to FIG. 6, example workspace features 600 are illustrated. At 610, users can specify the namespace of strongly typed dataset class within the workspace. This can include using Project Properties of the target project to change "Root Namespace (VB)" or "Default Namespace (C#)" for example. At 620, users can create a partial class file for strongly typed dataset class in the workspace. This can include one or more of the following actions from such as a workspace create or open already created partial class file for strongly typed dataset class:

```
        Double-click or View Code from context menu on Dataset
Designer surface
        Partial Class [DatasetName]
        End Class
    View Code from context menu on relations
        Partial Class [DatasetName]
        End Class
    View Code from context menu on XSD file in Solution
        Partial Class [DatasetName]
        End Class
    Double-click or View Code from context menu on DataTable
        header
        ' ' Following stub is for VB
Partial Class [DatasetName]
    Partial Class [DataTableName]
        Private Sub [DataTableName]_OrdersRowChanging ...
    End Sub
    End Class
End Class
Double-click or View Code from context menu on DataTable column
' ' Following stub is for VB
Partial Class [DatasetName]
    Partial Class [DataTableName]
        Private Sub [DataTableName]_ColumnChanging ...
    End Sub
    End Class
End Class
```

Name of partial class file: [DatasetName].Extended.[vb/cs]. Partial class file can be created in the strongly typed dataset class project. If there is a file with the same name in the strongly typed dataset class project, users can receive file overwrite prompt.

At 630 of FIG. 6, users can create a partial class file for Table Adapters class. This can include the following actions from a workspace create or open already created partial class file for Table Adapters class:

```
    Double-click or View Code from context menu on Table Adapter
header
    ' ' Following stub is for VB
    Namespace [TableAdaptersNamespace]
        Partial Class [TableAdpatersClass]
        End Class
    End Namespace
    Double-click or View Code from context menu on query methods in
Table Adapter
    ' ' Following stub is for VB
    Namespace [TableAdaptersNamespace]
        Partial Class [TableAdapterClass]
        End Class
End Namespace
```

Name of partial class file: [DatasetName].[vb/cs], where partial class file can be created in the Table Adapters class project. If there is a file with the same name in the projectable Adapters class project, users can receive a file overwrite prompt. As can be appreciated, other features and actions can be provided when creating multiple target projects from lower-tier applications or components.

Figure 7:
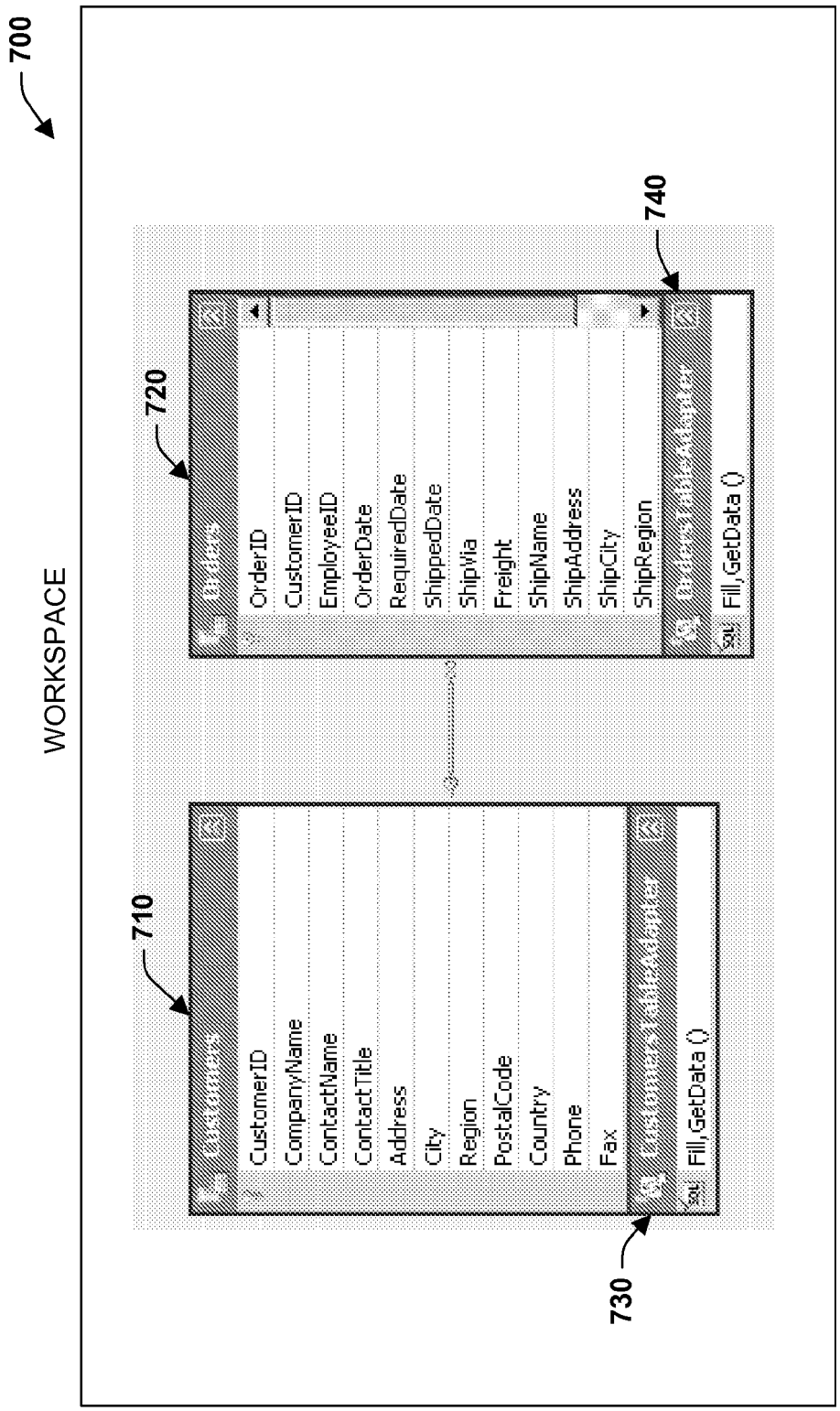
FIG. 7 illustrates an example designer workspace.

Turning to FIG. 7, an example designer workspace 700 is illustrated. In general, a Dataset Designer in the workspace 700 allows users to define an object model and map it to a database. In some examples, the designer generates code for:
1. A set of typed data tables that map to tables.
2. A set of Table Adapter classes—Used to pull and push object to the database. In the workspace 700, two example application components 710 and 720 are shown where each component provides a two-tiered application. At 710, a customer application component is associated with a second tier table adapter at 730, which in this case is a customer table adapter. At 720, an orders application is associated with an orders table adapter at 740. As can be appreciated, other configurations are possible from the examples shown.

Figure 8:
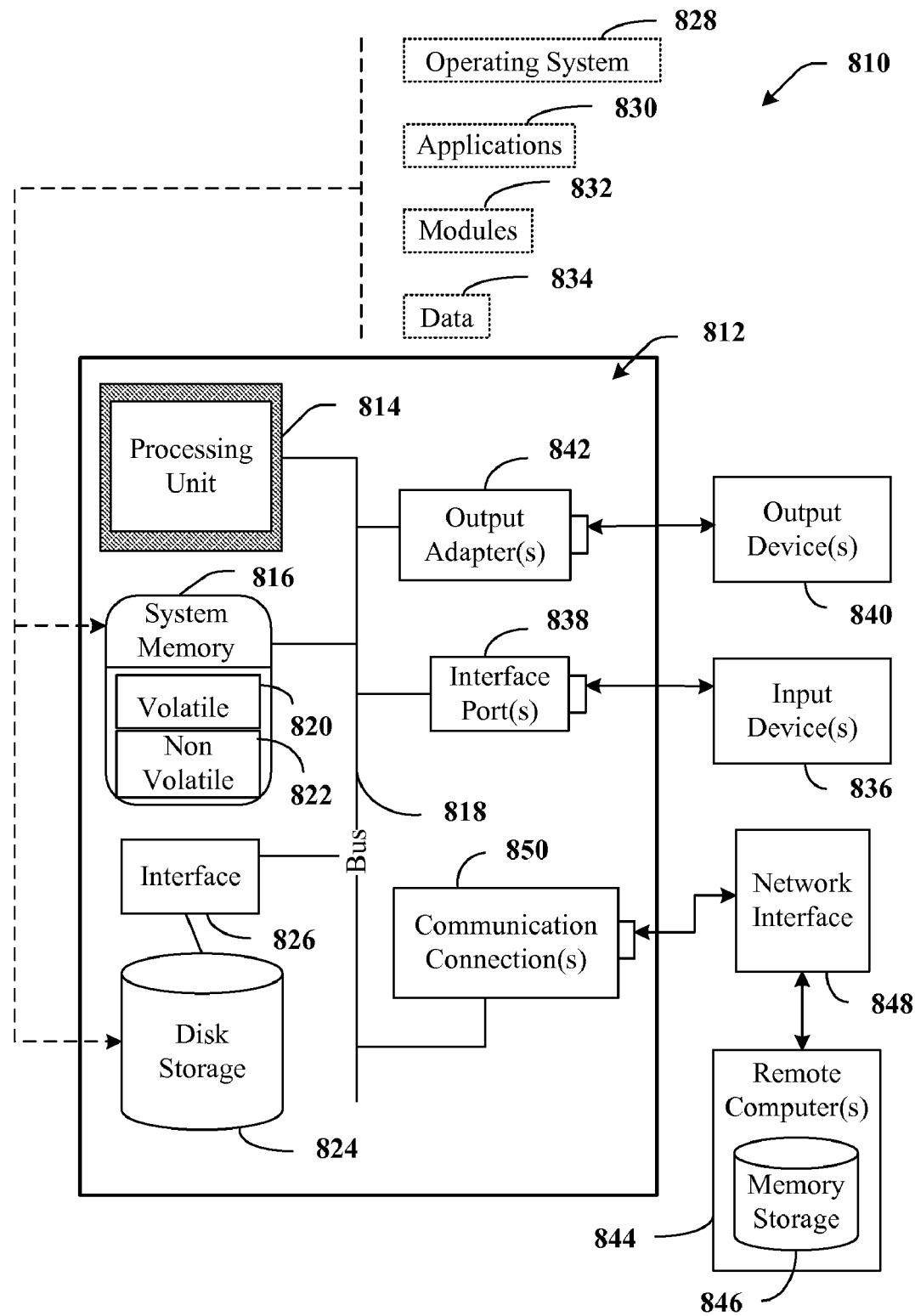
FIG. 8 is a schematic block diagram illustrating a suitable operating environment.
Figure 9:
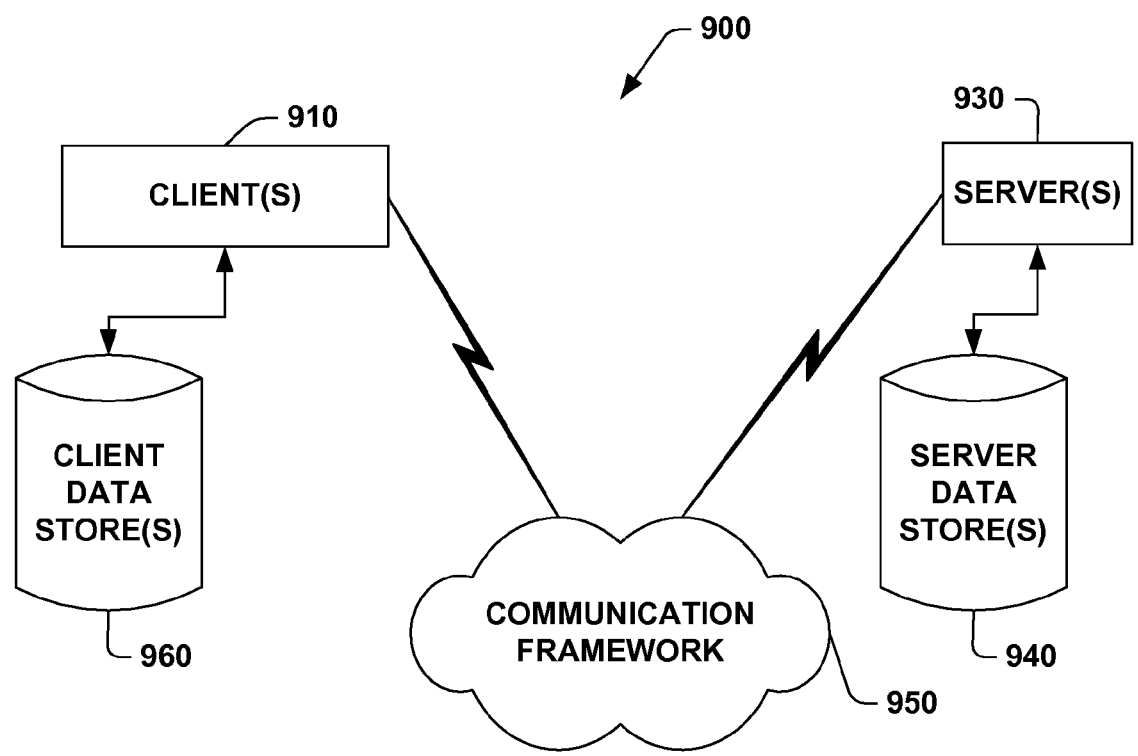
FIG. 9 is a schematic block diagram of a sample computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary environment 810 for implementing various aspects described herein includes a computer 812. The computer 812 includes a processing unit 814, a system memory 816, and a system bus 818. The system bus 818 couple system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812 and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed. The system 900 includes one or more client(s) 910. The client(s) 910 can be hardware and/or software (e.g. threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, implemented within a computing environment, for developing multi-tier typed dataset applications, the method comprising:

an act of a computer system, which includes one or more processors, generating a development user interface that includes models representing at least a portion of a typed dataset application, including:

at least one type definition model that represents a typed data table of the typed dataset application, the typed data table corresponding to at least one typed data table class that includes a strongly typed representation of one or more database objects, and at least one data access model that represents a table adapter of the typed dataset application, the table adapter corresponding to at least one table adapter class that maps data between the at least one typed data table class and the one or more database objects, wherein the development user interface concurrently represents the at least one type definition model and the at least one data access model on a single design surface, including a representation of one or more relationships between the at least one type definition model and the at least one data access model;

an act of the computer system receiving user input via the development user interface, the user input indicating that code for the at least one type definition model is to be generated into a first project, and that code for the at least one data access model is to be generated into a second project; and an act of the computer system receiving an instruction to generate code for the typed dataset application, and as a result:

an act of the computer system generating a first file corresponding to the first project that includes generated code for the at least one typed data table class; and an act of the computer system generating a second file corresponding to the second project that includes generated code for the at least one table adapter class.

2. The method of claim 1, further comprising an act of monitoring the at least one type definition model and the at least one data access model for changes.

3. The method of claim 2, further comprising an act of detecting a change in one or more of the at least one type definition model or the at least one data access model, and synchronizing the change between the at least one type definition model and the at least one data access model based on the one or more relationships.

4. The method of claim 3, further comprising an act of re-generating the first file and the second file with generated code that incorporates the change.

5. The method of claim 1, the act of the computer system receiving user input via the development user interface including an act of the computer system presenting to the user model dependencies and indicating to the user how to split generated code into at least the first project and the second project.

6. The method of claim 1, the act of the computer system receiving user input via the development user interface including an act of receiving user input via a visual movement of a mouse indicating one or more model separations.

7. The method of claim 1, the act of the computer system receiving user input via the development user interface including receiving one or more of a project name, a property value, a file name, or a file extension.

8. The method of claim 7, further comprising an act of presenting an error dialog when an invalid file name is received.

9. The method of claim 7, further comprising an act of presenting an overwrite dialog when a duplicate file name is received.

10. The method of claim 1, the first file corresponding to a business layer of a multi-tier typed dataset application.

11. The method of claim 1, the second file corresponding to a data access layer of a multi-tier typed dataset application.

12. One or more computer storage devices having stored thereon one or more computer-executable instructions that, when executed by one or more processors of a computer system, cause the computer system to perform a method for developing multi-tier typed dataset applications, including:
generating a development user interface that includes models representing at least a portion of a typed dataset application, including:
at least one business logic model that represents a typed data table of the typed dataset application, the typed data table corresponding to at least one typed data table class that includes a strongly typed representation of one or more database objects, and
at least one data access logic model that represents a table adapter of the typed dataset application, the table adapter corresponding to at least one table adapter class that maps data between the at least one typed data table class and the one or more database objects,
wherein the development user interface concurrently represents the at least one business logic model and the at least one data access logic model on a single design surface, including a representation of one or more relationships between the at least one business logic model and the at least one data access logic model;
receiving user input via the development user interface, the user input indicating that code for the at least one business logic model is to be generated into a first project, and that code for the at least one data access logic model is to be generated into a second project; and
receiving one or more instructions to generate code for the typed dataset application, and as a result:
generating a first file corresponding to the first project that includes generated code for the at least one typed data table class; and
generating a second file corresponding to the second project that includes generated code for the at least one table adapter class.

13. The storage device of claim 12, further comprising one or more computer-executable instructions that, when executed, also cause the computer system to monitor the at least one business logic model and the at least one data access logic model for changes.

14. The storage device of claim 13, further comprising one or more computer-executable instructions that, when executed, also cause the computer system to detect a change in one or more of the at least one business logic model or the at least one data access logic model, synchronizing the change between the at least one business logic model and the at least one data access logic model based on the one or more relationships, and re-generating the first file and the second file with generated code that incorporates the change.

15. A computer system, comprising:
one or more processors; and
one or more computer storage media storing executable instructions that, when executed by the one or more processors, implement a method for developing multi-tier typed dataset applications, the method comprising:
an act of the computer system generating a development user interface that includes one or more models representing at least a portion of a typed dataset application, including:
a first model representation of a typed data table of the typed dataset application, the typed data table corresponding to at least one typed data table class that includes a strongly typed representation of one or more database objects, and
a second model representation of a table adapter of the typed dataset application, the table adapter corresponding to at least one table adapter class that maps data between the at least one typed data table class and the one or more database objects,
wherein the development user interface concurrently represents the first model representation and the second model representation on a single design surface, including a representation of one or more relationships between the first model representation and the second model representation;
an act of the computer system receiving user input via the development user interface, the user input indicating that code for the first model representation is to be generated into a first project, and that code for the second model representation is to be generated into a second project; and
an act of the computer system receiving an instruction to generate code for the typed dataset application, and as a result:
an act of the computer system generating a first file corresponding to the first project that includes generated code for the at least one typed data table class; and
an act of the computer system generating a second file corresponding to the second project that includes generated code for the at least one table adapter class.

16. The computer system of claim 15, further comprising an act of monitoring the first model representation and the second model representation for changes.

17. The computer system of claim 16, further comprising an act of detecting a change in one or more of the first model representation or the second model representation, synchronizing the change between first and second model representations based on the one or more relationships, and re-generating the first file and the second file with generated code that incorporates the change.

* * * * *

UNITED STATES PATENT AND TRADEMARK OFFICE
CERTIFICATE OF CORRECTION

PATENT NO.         : 8,141,032 B2
APPLICATION NO.    : 11/670663
DATED              : March 20, 2012
INVENTOR(S)        : Joo et al.

It is certified that error appears in the above-identified patent and that said Letters Patent is hereby corrected as shown below:

<u>On the Title Page: Item (75): Inventors:</u>
Change "Zhanliang Chen" to -- John Z. Chen --

Signed and Sealed this
Twenty-fourth Day of July, 2012

David J. Kappos
*Director of the United States Patent and Trademark Office*